United States Patent [19]
de Mets

[11] 3,907,473
[45] Sept. 23, 1975

[54] CONTINUOUS PRESSES

[75] Inventor: Albert de Mets, Kachtem, Izegem, Belgium

[73] Assignee: Bison-werke Bahre and Greten GmbH and Co. KG, Germany

[22] Filed: Apr. 6, 1973

[21] Appl. No.: 348,603

[30] Foreign Application Priority Data
Apr. 7, 1972   Germany............................ 2216782
Mar. 19, 1973   Germany............................ 2313556

[52] U.S. Cl. ................. 425/141; 100/151; 100/153; 264/109; 264/319; 425/149; 425/224; 425/335; 425/371
[51] Int. Cl.² .......................................... B29C 3/06
[58] Field of Search ........... 425/149, 135, 161, 146, 425/223, 141, 224, 335, 371; 100/151, 173; 264/109, 319

[56] References Cited
UNITED STATES PATENTS

| | | | |
|---|---|---|---|
| 1,624,703 | 4/1927 | Witte | 100/151 UX |
| 2,046,047 | 6/1936 | Watkins | 100/151 |
| 2,618,426 | 11/1952 | Stover | 100/153 X |
| 2,958,096 | 11/1960 | Hant et al. | 425/371 X |
| 2,975,470 | 3/1961 | Snelson et al. | 425/371 X |
| 3,011,545 | 12/1961 | Welsh et al. | 100/153 UX |
| 3,241,182 | 3/1966 | Kessler | 425/327 X |
| 3,553,300 | 1/1971 | Buff | 425/371 X |
| 3,594,866 | 7/1971 | Skinner et al. | 425/371 X |
| 3,632,244 | 1/1972 | Sturgeon et al. | 425/145 X |
| 3,795,470 | 3/1974 | de Mets | 425/371 |

FOREIGN PATENTS OR APPLICATIONS
1,204,281   1959   France

Primary Examiner—Robert L. Spicer, Jr.
Attorney, Agent, or Firm—Craig & Antonelli

[57] ABSTRACT

A continuous press for use in the production of chipboard, fiberboard or the like which is provided with upper and lower cooperating pressing assemblies each of which comprises an endless belt carried by endless conveyors in the form of a series of articulated plates which are guided by polygonal rollers. A pressure applying arrangement is mounted internally of each of the endless conveyors adjacent the press inlet and presses outwardly on the plates of the conveyors in operation. A control arrangement is provided for adjusting the pressure applied by the pressure applying arrangement.

12 Claims, 3 Drawing Figures

CONTINUOUS PRESSES

The invention relates to a continuous press for use in the production of board material such as chipboard, fibreboard and the like, of the kind including upper and lower co-operating pressing assemblies each comprising an endless belt carried by an endless conveyor in the form of a series of articulated plates. Presses of this general type are known; see for example German Pat. No. 936,718, U.S. Pat. No. 2,926,719, and German Gebrauchsmuster No. 6,918,486. Usually, a first part of such a continuous press is used for the preliminary pressing of chipboard or fibreboard material, in which case it is unnecessary to heat the said conveyors or the said belts surrounding the same, whereas in another part of the press the conveyors and the belts are heated.

When the endless conveyors are guided by polygonal rollers, as already mentioned, it is found that the incoming plates of the conveyors at the press inlet, and particularly the plates of the upper conveyor, perform swinging movements which violently engage the layer of material to be compressed and tend to remove the finer particles of such material from the layer, which is undesirable because these particles are intended to form the smooth surface of the boards to be produced.

An object of the invention is therefore to reduce such swinging movements of the conveyor plates.

According to the invention there is provided a continuous press for use in the production of chipboard, fibreboard or the like, including upper and lower co-operating pressing assemblies each comprising an endless belt carried by an endless conveyor in the form of a series of articulated plates guided by polygonal rollers, pressure applying means mounted internally of each of said endless conveyors adjacent the press inlet and arranged to press outwardly on the plates of said conveyors in operation, and control means for adjusting the pressure applied by said pressure applying means.

With such an arrangement undesired swinging movements of the endless plate conveyors and thus also undesirable movements of the endless belts surrounding the conveyors can be reduced and even substantially avoided.

Preferably each of the said pressure applying means comprises at least one pressure applying roller which is preferably mounted in a freely rotatable manner.

If the guiding or holding means for each pressure applying means is fixed to the press it is preferable to arrange for the direction in which pressure is applied by each pressure applying means to be adjustable. To achieve this, preferably each of said pressure applying means comprises a support which is pivotably mounted and securable in any of a plurality of pivotal positions to adjust the said direction of pressure application. As a result it is possible to change the direction of operation of the pressure applying means, for example when the thickness of the boards to be produced is changed.

Preferably each of said pressure applying means comprises two pressure applying members mounted on a pivotally mounted support. For as long as the thickness of the material layer to be compressed is unchanged, pressure stabilisation in the pressure applying means is adequate; in such circumstances the said control means could take a very simple form, e.g., a compression spring. However, if the layer thickness changes it is also necessary to change the pressure applied. So as to avoid changing the pressure by hand it is further proposed that each of said pressure applying means comprises a hydraulic or pneumatic operating cylinder connected via a pipe to receive pressurised fluid from a reservoir, and the said control means comprises an electromagnetically controllable feed valve with a choke situated in said pipe, a minimum/maximum contact manometer and an adjustable pressure relief valve with series-connected choke and an over-pressure safety valve all connected to said pipe, all of these elements being arranged in such a way that after switching on a power source via a time-lag relay the said feed valve is automatically opened to build up a minimum pressure in the said operating cylinder, on reaching which pressure the feed valve closes, whilst upon the pressure in the operating cylinder exceeding a predetermined maximum level the said pressure relief valve opens and closes again when the pressure falls below said maximum level, the said time-lag relay being arranged to open the said pressure relief valve when the pressure in the operating cylinder remains below a predetermined set minimum level for longer than a selectable time.

An embodiment of the invention will now be described by way of example and with reference to the accompanying drawings, in which.

Figure 1:
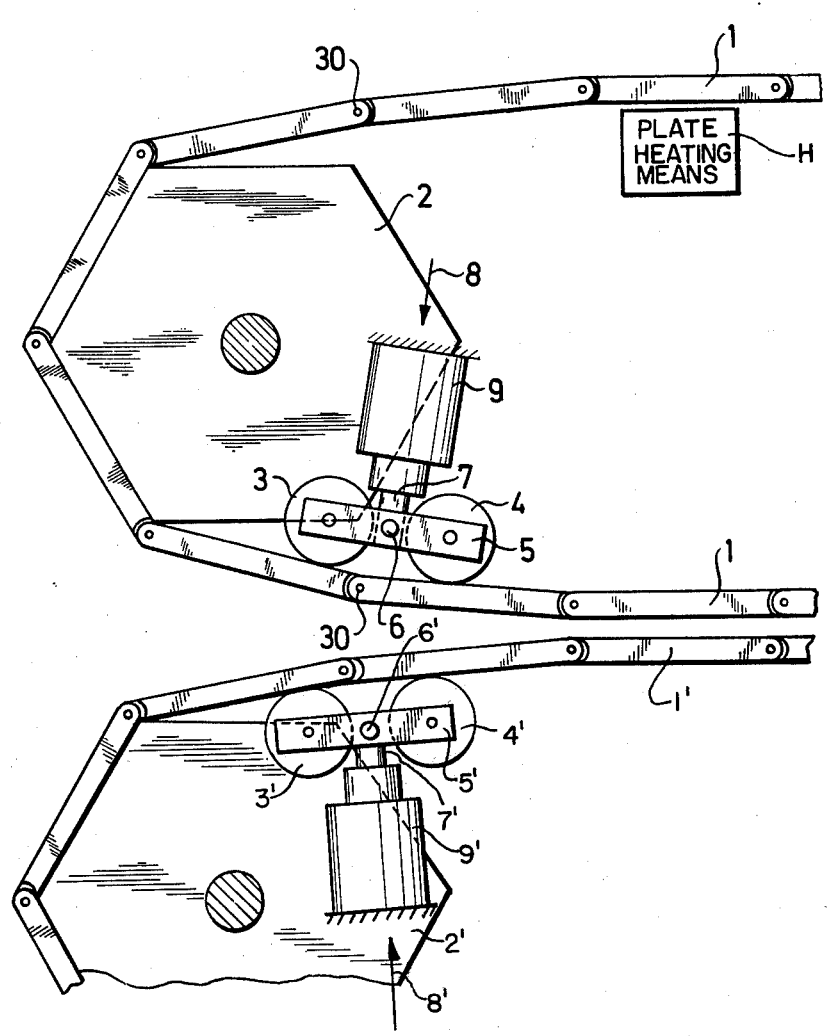
FIG. 1 shows the inlet end of the upper and lower pressing assembly of a continuous press according to the invention.

Referring first to FIG. 1, wherein an upper and lower pressing assembly is illustrated with the upper pressing assembly comprising an endless articulated plate conveyor 1 guided by guide rollers 2 having a polygonal peripheral contour and driven by feed rollers (not shown). Between the guide roller 2 at the inlet for the strewn layer of material to be treated and the first feed roller (not shown) of each endless articulated plate conveyor, is provided at least one pressure applying means which acts to tend to increase the size of the space surrounded by the particular plate conveyor 1. In the illustrated example two pressure applying members 3 and 4 are provided which are mounted in a support 5 and are in the form of rollers. The support 5 is pivotable about a pin 6 relative to a shaft 7 which is itself movable in the direction of arrow 8 by an adjustable pressure. This pressure can for example be produced by the shaft 7 being under the action of hydraulic pressure in cylinder 9. A conventional heating means H may be provided for heating the articulated plates of the endless plate conveyor 1.

Not illustrated is the case where only one pressure applying member is provided, nor the case where a displaceably guided support of the pressure applying member(s) is pivotable and securable in any of several pivot positions. In such a case the pressure applying member(s) would be mounted on the shaft 7 constituting the said displaceably guided support and the cylinder 9 would be pivotable and securable in any of several pivot positions.

As further shown in FIG. 1, the lower pressing assembly comprises an endless articulated plate conveyor 1', guided by guide rollers 2' having a polygonal peripheral contour. At least one pressure applying means is mounted internally of the lower pressing assembly for applying a pressure outwardly on the articulated plates of the lower pressing assembly. As with the upper pressing assembly, two pressure applying members 3', 4' in the form of rollers may be provided and mounted in a support 5' which is pivotal about a pin 6' relative to a shaft 7' which is displaced in the direction of arrow 8' by action of hydraulic pressure in a cylinder 9'.

Figure 2:
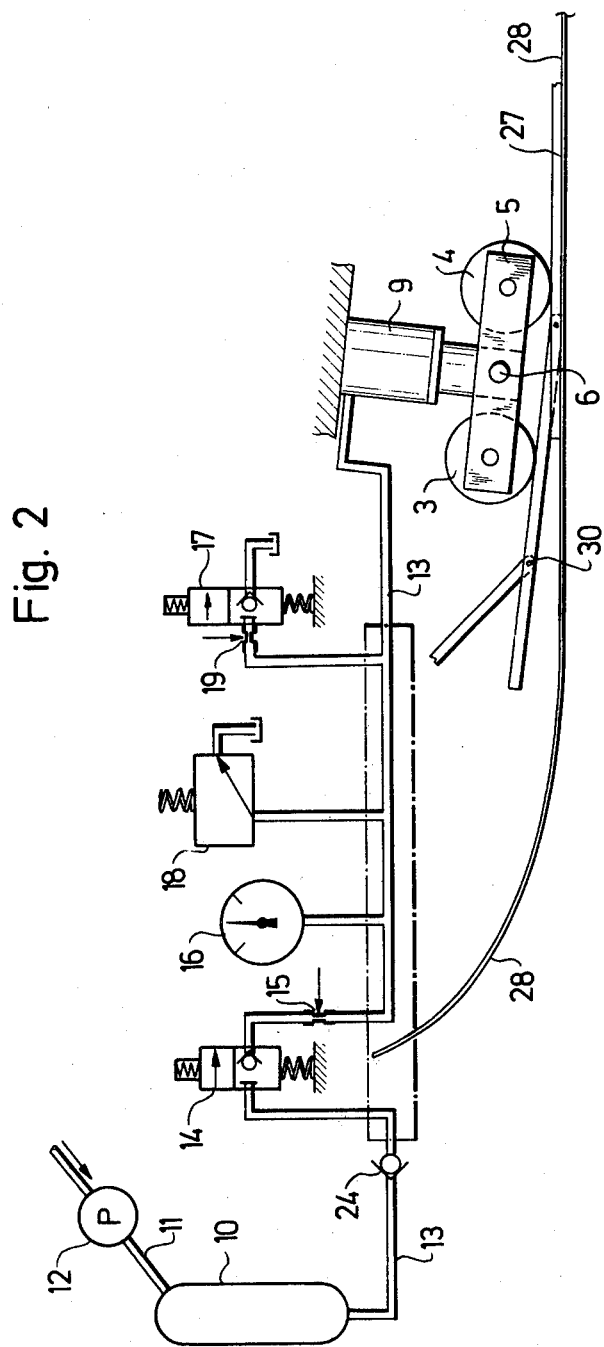
FIG. 2 is a hydraulic diagram of the control means of the press.

As shown in FIG. 2, according to the present invention, it is possible to adjust the pressure in the hydraulic cylinder 9 or 9' in such manner as to be able to correspondingly change the position of one or both pressure applying members in accordance with the change of thickness of the boards to be produced. For the sake of brevity only the pressure adjusting arrangement of the upper pressing assembly will be further described in detail, it being understood that the lower pressing assembly adjusting arrangement may be constructed similarly. Specifically, as shown in FIG. 2, the pressure cylinder 9 is connected to a reservoir 10 which is connected with a hydraulic pump 12 via a pipe 11 so that an adequately high pressure is always available in reservoir 10. In a pipe 13 which connects pressure cylinder 9 with reservoir 10 is provided an electromagnetically controllable feed valve 14 and an adjustable choke 15. Also to pipe 13 are connected a minimum/maximum contact manometer 16, a controllable pressure relief valve 17, and an overpressure safety valve 18. Between pipe 13 and pressure relief valve 17 is provided an adjustable choke 19.

Figure 3:
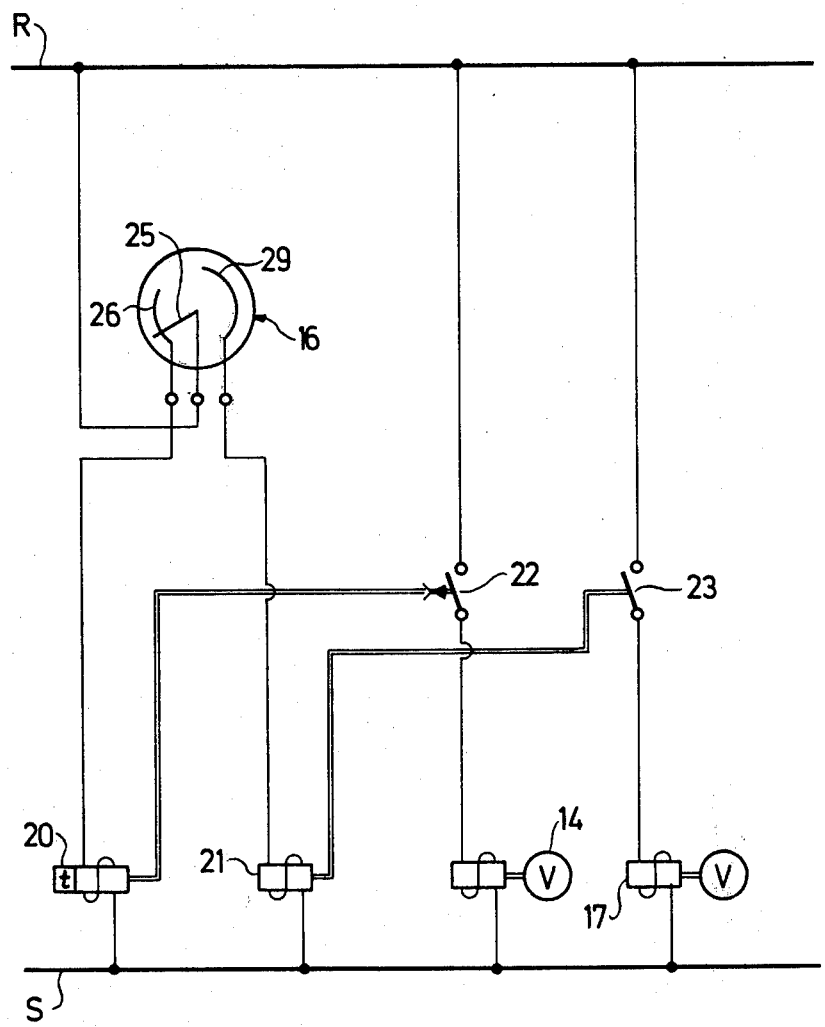
FIG. 3 is an electrical circuit diagram of such control means.

Referring now also to FIG. 3, between phases R and S of an alternating current source is connected the minimum/maximum contact manometer 16 via a time-lag relay 20 and a relay 21. Time-lag relay 20 controls a switch 22 and relay 21 a switch 23. Switch 22 is located in series with feed valve 14 and switch 23 with pressure relief valve 17 between the two phases R and S. FIG. 3 shows the de-energised state.

When power is switched on the time-lag relay is energised and after a selectable time, for example 20 seconds, closes switch 22. As a result feed valve 14 is opened and the pressure fluid present in reservoir 10 is supplied to cylinder 9 via a non-return valve 24; choke 15, on the sudden opening of feed valve 14, ensures a gradual rise of pressure. If contact indicator 25 of manometer 16 leaves minimum contact 26 then time-lag relay 20 is de-energised so that switch 22 is opened again and feed valve 14 closes pipe 13. During the above-described processes the press continues to operate; thus the two superimposed plate conveyors, whereof only the upper plate conveyor 27 is shown, and the two steel belts surrounding said plate conveyors, whereof only the upper steel belt 28 is shown, continue to revolve without exerting a pressure action. If now a layer of shavings is introduced into the press inlet this layer of material, via steel belt 28 and plate conveyor 27, acts on pressure members 3 and 4 to tend to cause a pressure rise in cylinder 9, so that pressure in pipe 13 rises and contact indicator 25 is moved in the direction of maximum contact 29. When contact indicator 25 reaches maximum contact 29 then relay 21 closes switch 23 so that pressure relief valve 17 opens and automatically a pressure drop is brought about in pipe 13.

If pressure in pipe 13 drops only temporarily, for example until contact indicator 25 comes into contact with minimum contact 26, then this reduced pressure is initially maintained without pressure fluid being supplied to pipe 13 via feed valve 14 because time-lag relay 20 only operates when the drop below the minimum admissible pressure has lasted for some time. If for example a pressure lower than the minimum set value lasts for 20 seconds then switch 22 is closed again in order to again connect feed valve 14 with the reservoir and pipe 13.

If the pressure in pipe 13 fluctuates in such a way that contact indicator 14 moves to and fro between minimum contact 26 and maximum contact 29 then the pressure in the pipe 13 does not vary. This solution not only has the advantage that the pressure members 3 and 4 can be adapted to layers of material of varying thickness, but, and this is very important, each plate of the upper plate conveyor which moves into the inlet area of the press is very rapidly brought into immediate proximity with the top of the material layer and is then pressed relatively slowly against said layer. As a result, undesirably violent engagement of the plate on the material layer is reliably prevented.

Obviously contact manometer 16 must be set to predetermined values, for example minimum contact 26 to an oil pressure of 10 kp/cm$^2$ and maximum contact to for example 30 kg/cm$^2$.

If the thickness of the material layer remains substantially constant then each downwardly inclined joint 30 which connects adjacent plates of the endless plate conveyor is pressed downwards by pressure roller 3 or pressure rollers 3 and 4 until the plate located downstream of the joint rests substantially flat on the layer. The pressure in pipe 13 is thereby reduced. As the next-following joint approaches this position then pressure roller 3 or pressure rollers 3 and 4 are influenced by a rise in pressure in pipe 13 until the further movement of the endless plate conveyor lowers the pressure again. Switching processes are not performed. If for some reason the thickness of the layer becomes less and for a certain time the pressure in pipe 13 remains below the minimum pressure, then time-lag relay 20 closes switch 22 and the pressure feed valve opens so as to increase the pressure in pipe 13 above the minimum. Correspondingly if the thickness of the material layer becomes greater the pressure in the pipe 13 rises and contact indicator 25 reaches maximum contact 29 so that, via relay 21 and switch 23, pressure relief valve 17 is caused to open.

The arrangement of the two chokes 15 and 19 ensures that the pressure in pipe 13 neither rises nor falls too suddenly.

What I claim is:

1. A continuous press for use in the production of chipboard, fibreboard or the like, including upper and lower cooperating pressing assemblies each comprising an endless belt carried by an endless conveyor in the form of a series of articulated plates guided by polygonal rollers, at least one pressure applying means mounted internally of each of said endless conveyors adjacent the press inlet and arranged to press outwardly on the plates of said conveyors in operation, and control means for adjusting the pressure applied by said pressure applying means.

2. A press as claimed in claim 1, including means for heating said articulated plates.

3. A press as claimed in claim 1, wherein each of the said pressure applying means comprises at least one pressure applying member in the form of a roller.

4. A press as claimed in claim 1, wherein the direction in which each of the said pressure applying means applies pressure is adjustable.

5. A press as claimed in claim 4, wherein each of said pressure applying means comprises a support which is pivotably mounted and securable in any of a plurality of pivotal positions to adjust the said direction of pressure application.

6. A press as claimed in claim 1, wherein each of said pressure applying means comprises two pressure applying members mounted on a pivotally mounted support.

7. A press as claimed in claim 1, wherein each of said pressure applying means comprises a hydraulic or pneumatic operating cylinder connected via a pipe to receive pressurised fluid from a reservoir, and the said control means comprises an electromagnetically controllable feed valve with a choke situated in said pipe, a minimum/maximum contact manometer and an adjustable pressure relief valve with series-connected choke and an over-pressure safety valve all connected to said pipe, all of these elements being arranged in such a way that after switching on a power source via a time-lag relay the said feed valve is automatically opened to build up a minimum pressure in the said operating cylinder, on reaching which pressure the feed valve closes, whilst upon the pressure in the operating cylinder exceeding a predetermined maximum level the said pressure relief valve opens and closes again when the pressure falls below said maximum level, the said time-lag relay being arranged to open the said pressure relief valve when the pressure in the operating cylinder remains below a predetermined set minimum level for longer than a selectable time.

8. A press as claimed in claim 2, wherein each of said pressure applying means comprises at least one pressure applying member in the form of a roller.

9. A press as claimed in claim 2, wherein each of said pressure applying means comprises a support which is pivotally mounted and securable in any of a plurality of pivotal positions to adjust the direction of pressure application.

10. A press as claimed in claim 3, wherein the direction in which each of said pressure applying means applies pressure is adjustable.

11. A press as claimed in claim 10, wherein each of said pressure applying means comprises a support which is pivotally mounted and securable in any of a plurality of pivotal positions to adjust the direction of pressure application.

12. A press as claimed in claim 11, wherein each of said pressure applying means comprises two pressure applying members mounted on said pivotally mounted supports.

* * * * *